United States Patent

[11] 3,587,402

[72] Inventors Wilhelm Schluter
Dortmund-Gartenstadt;
Rolf Thonigs, Dortmund-Lucklemberg,
Germany
[21] Appl. No. 821,402
[22] Filed May 2, 1969
[45] Patented June 28, 1971
[32] Priority May 8, 1968
[33] Germany
[31] P 17 50 497.1

[54] PRESSURE MEDIUM OPERABLE DRIVE FOR GIANT ANTIFRICTION BEARINGS
13 Claims, 5 Drawing Figs.

[52] U.S. Cl. .................................................. 91/498,
91/176, 91/180
[51] Int. Cl. ............................................... F01b 1/06,
F01b 13/06, F01l 33/02
[50] Field of Search ..................................... 91/180,
205, 176 (Cursory); 103/161 (Cursory)

[56] References Cited
UNITED STATES PATENTS
| | | | |
|---|---|---|---|
| 1,533,514 | 4/1925 | Ragot ............................ | 91/180 |
| 1,987,781 | 1/1935 | Maw............................... | 91/205 |
| 3,369,457 | 2/1968 | Guinot ........................... | 91/205 |

*Primary Examiner*—Paul E. Maslousky
*Attorney*—Walter Becker

ABSTRACT: The invention concerns a fluid drive for effecting relative rotation between the inner and outer races of a giant antifriction bearing and has radial cylinders connected to the outer race of the bearing and located inside the inner race and having outwardly acting pistons therein which engage an undulating cam connected to the inside of the inner race of the bearing. A ring element connected to the radially inner ends of the cylinders receives a tubular block that is connected to the inner race and fluid is supplied to the cylinders and exhausted therefrom by passages extending from the cylinders through said member and block.

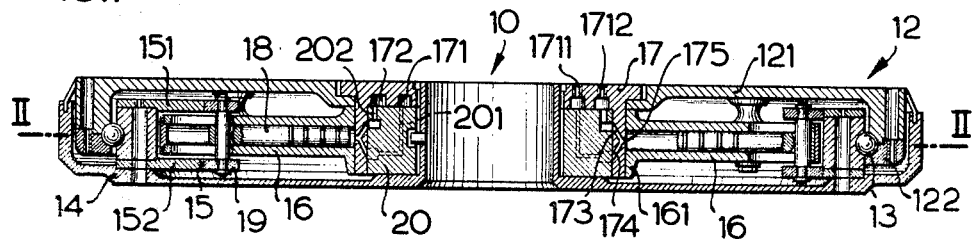
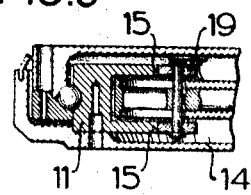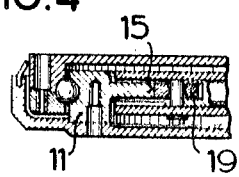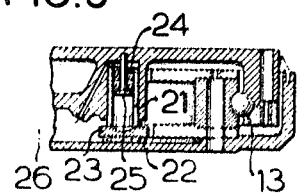
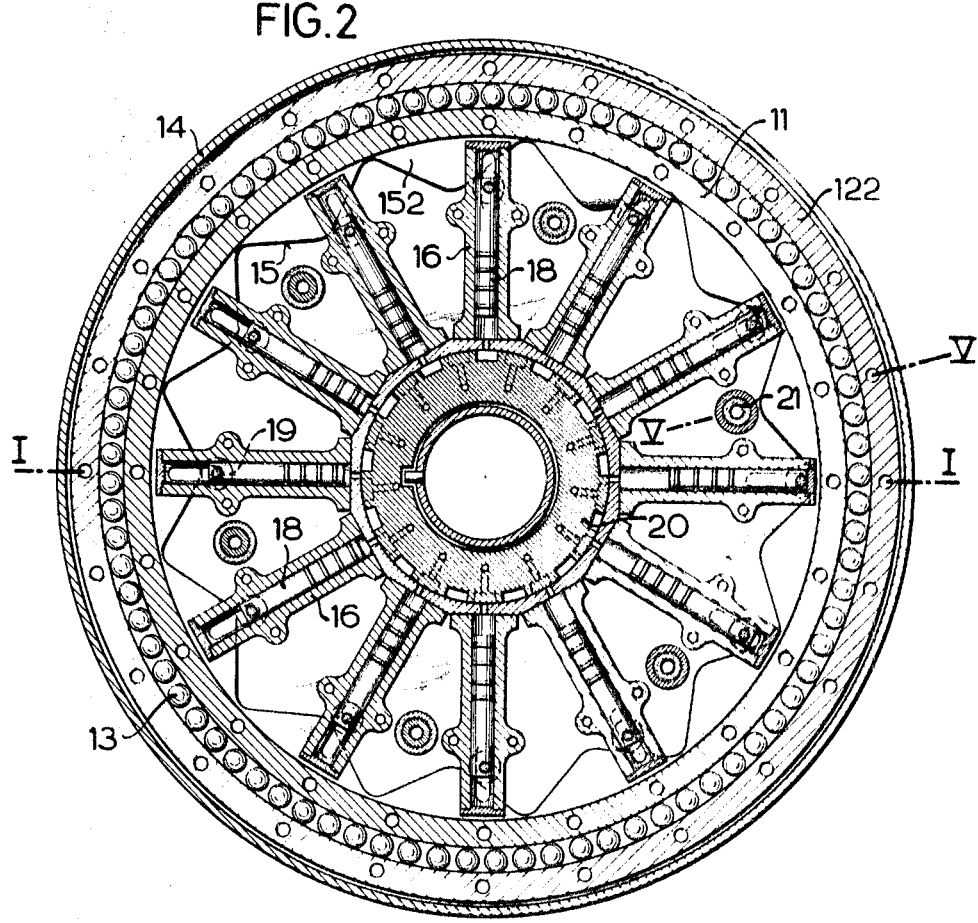

PRESSURE MEDIUM OPERABLE DRIVE FOR GIANT ANTIFRICTION BEARINGS

The present invention relates to a pressure fluid operable drive for giant antifriction bearings, especially ball turntables, in which the antifriction bearings may be arranged in one or two rows. Such giant antifriction bearings comprise an outer ring and an inner ring of which one ring is connected to the rotatable part of an implement, as for instance an earth-working machine, whereas the other ring is connected to the nonrotatable part of such implement. The pressure fluid operable driving units comprise a cylinder and a piston and are arranged in the free inner chamber of the ball turntable in a plane perpendicular to the axis of rotation of the turntable while the space within the area of the tuning axis is free for mounting conveying elements, such as linkages, control conduits, etc.

To an ever increasing extent, normally such giant antifriction bearings as they are used, for instance, with movable earth-working machines or cranes and stationary cranes or other implements in a pivotable or rotatable upper part thereof, are driven in such a way that the bearing ring provided for the rotary movement has its circumference on the outside or the inside provided with teeth which mesh with a pinion which in its turn is driven by a motor through the intervention of a stepdown transmission. Such drives require relatively considerable space and furthermore have almost always to be mounted above or below the bearing ring plane. Furthermore, the mechanical or similar brakes required for the braking operations take up considerable space. This represents a great disadvantage with respect to an expensive construction. In addition thereto, for carrying out the various working operations as they are required, for instance, with earth-working machines, not mechanical power-conveying elements, such as chains, cables and the like, are used, but pressure fluid operable devices. Since with implements of this type already pressure fluid operable devices are present, it would appear expedient and advantageous to use such pressure fluid operable devices also for the drive effecting the tilting or tuning movement of the upper part without the interposition of a mechanical drive.

Such designs according to which the driving units are mounted in the interior of the ball turntable so that the central area of the turning axis remains free for the passage of control conduits, rods, etc., are known.

It is an object of the present invention to provide a pressure fluid operable drive, especially for the about outlined purpose, which will assure a constant uniform and even pivoting or turning movement of the upper part relative to the nonrotatable lower part and in addition thereto will also assure that no radial pressure from the turning or pivoting drive is to be absorbed by the bearing system, particularly since ball turntable are involved which are to be used in connection with giant antifriction bearings or bearing systems for the transmission of high torques.

It is a further object of this invention to provide an arrangement as set forth in the preceding paragraph in which the useful space in the upper part of the implement will not be taken up by heavy turning drives and brakes.

It is still another object of the present invention to provide an arrangement as set forth above which with small implements will be able to transmit torques of approximately 5,000 mk. and with large implements to transmit torques up to 100,000 mk.

These and other objects and advantages of the invention will appear more clearly from the following specification in connection with the accompanying drawings, in which:

FIG. 1 illustrates a longitudinal section through a ball turntable with a pressure fluid operable drive, said section being taken along the line I–I of FIG. 2.

FIG. 2 is a section taken along the line I–I of FIG. 1.

FIG. 3 shows by way of a cutout an inner ring with a double cam surface.

FIG. 4 shows by way of a cutout an inner ring with a single cam surface.

FIG. 5 illustrates the arrangement of a braking element by way of a longitudinal section taken along the line V–V of FIG. 2.

The pressure fluid operable drive according to the present invention is characterized primarily in that the cylinders are detachably arranged directly on the outer ring and on a counter ring which is connected to the outer ring and provided with open annular passages and bores while the pistons subjected to the pressure fluid cooperate through the intervention of rollers with a closed sine-shaped cam surface provided on the inner side of the inner ring.

The rollers are spherically by means of transverse bolts connected to those ends of the pistons which face the circumference of the ball turntable in order to adapt themselves to the mutual inclined positions of the bearing rings with regard to the bearing plane as brought about by the torque loads, and also to adapt themselves to the lack of uniformity of the cam surfaces when two cam rings are employed.

The number of the driving units amounts to $a=(42n)$ with $n=1$ or a whole multiple of 1. The number will be increased when the torque to be transmitted is, for instance, relatively high. In view of this increase in number, the cam path is subjected to less stresses when the individual pistons which are acted upon by the pressure medium rest against the cam path or surface. The cam surface or path itself may be hardened, tempered or may be naturally hard.

When employing a greater number of driving units, the radial pressure acting upon the bearing system through the turning or pivoting operation will be equalized inasmuch as two driving units diametrically oppositely arranged with regard to each other are connected to the counter ring. The cam path is so designed that each inner reversing point has located opposite thereto an outer reversing point. The cam path is furthermore so designed that the total of the two individual piston strokes measured from the inner dead center point and pertaining to two oppositely located pistons equals the total stroke of one piston. For the cooperation of piston and cam path there is provided at least one roller. When employing two rollers, such rollers are guided by two cam paths having the cylinders arranged therebetween.

According to a further feature of the invention, for influencing the conveying of the pressure fluid, there is provided a control ring which does not rotate but is resting on a pan carrying the inner ring. This control ring establishes connection between the annular passages and the bores of the counter ring which lead to the cylinder. The bores in the counter ring lead to a common opening on the side of the cylinder connection and on the other side of the counter ring cooperate with connecting bores of the control ring which are located in different planes and lead to the annular passages of the counter ring.

Independently of obtaining the braking of an initiated pivoting or turning movement by controlling the supply of pressure fluid to the piston, there is provided a further pressure fluid controlled and mechanically effective braking device. More specifically, on the outer ring between the driving units, i.e. between the cylinders, there are arranged braking elements which in axial direction are adapted to be subjected to pressure fluid and act upon the pan which receives the inner ring. Each individual braking element comprises a guided hollow cylinder which carries a plate provided with a brake lining. The control of this braking device is effected by a separate control conduit. This braking device is not necessary under all circumstances since also a braking operation can be realized by the control valve for obtaining a left-hand or right-hand turning movement.

Referring now to the drawing in detail, a ball turntable 10 is shown therein as it may be used, for instance, in a movable earth-working machine as connecting element between the undercarriage and the pivotable or rotatable upper carriage. The ball turntable 10 comprises an inner ring 11 and an outer ring 12 which latter may be composed, for instance, of the two outer ring sections 121 and 122. The pressure forces are in the specific instance shown in the drawing transferred by one row of balls 13. The inner ring 11 rests on a pan 14 to which it is connected by screws and which is adapted to be connected with a nonrotatable lower part, as for instance an undercarriage.

According to FIG. 1, the inner ring 11 has connected thereto an upper ring 151 the inner circumference of which is provided with a sine-shaped path 15, and has furthermore connected thereto a correspondingly designed lower ring 152.

According to FIG. 3, the inner ring 11 is so designed that it simultaneously comprises the curved path 15 and, more specifically, in two different planes, whereas FIG. 4 shows the inner ring 14 with only one curved path 15.

Threadedly connected to the outer ring section 121 are cylinders 16 which pertain to the driving units and extend perpendicularly with regard to the axis of rotation of the turntable while being located in the free inner chamber of the turntable 10. The flanges 161 of the cylinders 16 are fitted to a counter ring 17. A piston 18 which is adapted on one side to be subjected to a pressure fluid medium for actuation of the piston is guided within the interior of the cylinder 16 and has one of its ends provided with a roller 19 (FIG. 4) which cooperates with the curved path or cam 15. In conformity with the design having two curved paths or cam surfaces 15, as shown in FIGS. 1 and 3, two rollers 19 are provided. The rollers 19 are supported by transverse bolts which are guided in spherical recesses of the pistons 18. If desired, the bore of the roller 19 may be spherical (FIG. 4). The counter ring 17 which is connected to the outer ring section 121 takes part in the pivoting or turning movement of the outer ring 12. The annular passages 171, 172 which are provided in the counter ring 17 are adapted through bores 1711, 1712 and a simple reversing valve to be connected to a pump (not illustrated). The bores 173, 174 which lead into a common opening 171 located on the side of the fitted flange 161 cooperate on the other side of the counter ring 17 with connecting bores 201, 202 which are located in different planes and pertain to a nonrotatable control ring 20. These connecting bores 201, 202 represent the connection with the annular passages 171, 172.

When subjecting the piston 18 to pressure fluid while the pressure medium from the annular passage 172 acts through connecting bore 202, bore 173 and opening 175 upon the piston surface of the piston 18, the piston 18 with its roller 19 is pressed outwardly against the cam surface 15 as a result of which the rotating or pivoting movement is initiated. The diametrically oppositely located piston 18 is returned to its inner dead center point by the cam surface 15 because the medium is pressureless and flows back through opening 175, bore 174 and connecting bore 201 into the annular passage 171 and through the connection 1711 to the pump. The connecting bore 201 of one plane is offset with regard to the connecting bore 202 of the other plane on the outer circumference of the control ring 20 in such a way that the opening 175 moves in front of the connecting bore until the bore 19 of the piston 18 moves over the pertaining cam path or cam surface 15. If it is desired that the upper part moves in opposite direction, in the control unit (not shown) the other pressure fluid conveying conduit leading to the control ring 20 is subjected to pressure so that the previous pressure fluid conveying conduit which is now without pressure will act as return conduit for the pressure fluid from the cylinder 16.

For stopping the outer and inner ring 12, 11 with regard to each other so that any rotary movements are prevented, the valves (not shown) of the two feeding conduits are closed in the control unit. For braking the turning movement, a counter control is effected to a greater or lesser extent by means of the control valve which means that the control valve is shifted over for the opposite rotary movement.

In order during the braking and blocking operations to prevent the pressure in the conduits from increasing too much, a pressure relief valve is provided in the conduits, and this pressure relief valve is so adjusted that its opening pressure is slightly above the working pressure for producing the maximum torque but is below the permissible working pressure.

For freewheeling after initiating or carrying out a rotary movement toward the right or toward the left, the control valve is so adjusted that no pressure is conveyed by the pump to the pistons 18. The pistons 18 which are returned to their inner dead center points by means of the cam path 15, release their pressure medium through simultaneously opening return valves which precede the control valve for the pressure fluid drive. For blocking the rotary movement, any delivery or withdrawal of any pressure medium is interrupted or prevented in the control valve while for a possible emergency relief valves are provided in the two conduits between pressure cylinders and control valve which relieve too high a pressure of the pressure medium.

Independently of the above-mentioned braking operation, there may be provided a braking device which is adapted to be controlled independently but likewise by means of the pressure medium.

On the inner side of the outer ring section 121, between the individual cylinders 16, these braking units are provided which comprise a guided hollow cylinder 21 supporting a plate 23 provided with a brake lining 22. When the hollow cylinder 21 is subjected to the influence of a pressure fluid, the brake lining 22 will rest on the inside of the pan 14. A pressure spring 24 which is arranged in the hollow cylinder 21 and which, when the hollow cylinder 21 moves outwardly, rests against a pushrod 25 will, when the braking conduit 26 becomes pressureless, return the cylinder 21 so that the brake is released again.

It is, of course, to be understood that the present invention is, by no means, limited to the particular construction shown in the drawing but also comprises any modifications within the scope of the appended claims.

We claim:

1. A drive arrangement for a giant antifriction bearing which has outer and inner races and antifriction elements interposed between the races, one of said races being adapted to be connected to a nonrotatable machine part and the other to a rotatable machine part, and drive means inside said inner race for driving said races and, therefore, said parts in relative rotation, said drive means comprising: a tubular member at the center of said bearing coaxial therewith and connected to said outer race, radial cylinders uniformly circumferentially distributed inside said inner race and having their radially inner ends connected to said tubular member, pistons in said cylinders reciprocable therein toward and away from said inner race, undulating cam means connected to the inside of said inner race and engaged by said pistons, and means for supplying pressure fluid through said tubular member to the radially inner ends of said cylinders and for exhausting fluid from said cylinders through said tubular member, said tubular member having a flange at one end whereby the interior of said tubular member has a peripheral wall and an end wall, a pair of annular grooves in said end wall adapted for being connected to a source of pressure fluid and to exhaust respectively, an annular block connected to said inner race and fitted in said tubular member so as slidably to engage said end wall and peripheral wall thereof, first and second passages in said block leading from respective ones of said grooves to the periphery of said block, and passage means in said tubular member leading from said cylinders into said cavity and communicating alternately with said first and second passages as said races rotate relatively and cause relative rotation of said tubular member and block.

2. A drive arrangement according to claim 1, in which the number of said cylinders is equal to an even number greater than 4 and the number of undulations on said cam means differs from the number of cylinders by one.

3. A drive arrangement according to claim 2, in which the said undulations of said cam means are so shaped that the distance between any point along the cam and the point on the cam diametrally opposite remains constant.

4. A drive arrangement according to claim 1, in which said pistons have roller means thereon engaging said cam means.

5. A drive arrangement according to claim 4, in which said cam means is in the form of a pair of parallel axially spaced cams.

6. A drive arrangement according to claim 4, in which said roller means are tiltably carried on said pistons.

7. A drive arrangement according to claim 1, in which said first and second passages have their ends at the periphery of said block arranged in respectively different axial planes and spaced circumferentially about said block so as to communicate alternately with the said passage means in said tubular member in succession, the angular spacing between successive ones of the ends of each of said first and second passages being equal to the angular spacing between adjacent ones of the convolutions on said cam means.

8. A drive arrangement according to claim 1, which includes fluid-operable brake means disposed between at least one adjacent pair of said cylinders operatively carried by one of said races and expansible by fluid pressure into operative braking engagement with the other of said races.

9. A drive arrangement according to claim 8, in which said brake means comprises piston-cylinder means, friction element means on the end of the piston means for operative braking engagement with said other of said races upon axial expansion of said piston-cylinder means, and means biasing said piston-cylinder means toward collapsed position.

10. A driving arrangement according to claim 7, which includes a first platelike element on one axial side of said bearing connecting said outer race with said member and a second platelike element on the other axial side of said bearing connecting said inner race with said annular block and having a central hole therein, said radial cylinders and pistons and cam means all being contained in the axial space between said platelike elements.

11. A driving arrangement according to claim 10, in which points along said cylinders remote from said tubular member are connected to said first platelike member to support said cylinders in their respective radial positions.

12. A driving arrangement according to claim 10, in which said second platelike element engages said block on the end of the block opposite said end wall of said tubular member and confines said block in said tubular member, said second platelike element having a central axial flange telescopically and nonrotatably engaging the inside of said annular block and a peripheral axial flange loosely telescoping over said outer race so as to be freely rotatable relative thereto.

13. A driving arrangement according to claim 10, which includes a plurality of axial cylinder means carried on the side of said first platelike element which faces said second platelike element and positioned between adjacent pairs of said radial cylinders, a piston member in each said cylinder means spring urged toward retracted position therein and having friction means on the outer end thereof, and means for supplying fluid under pressure to said cylinder means to actuate said piston elements to press said friction means into braking engagement with said second platelike element.